United States Patent Office 3,282,887
Patented Nov. 1, 1966

3,282,887
NICKEL PHENOLATES AND THEIR USE AS LIGHT STABILIZERS FOR POLYOLEFINS
Mary Lou Soeder, Minneapolis, Minn., assignor to Hercules Incorporated, a corporation of Delaware
No Drawing. Filed Aug. 6, 1962, Ser. No. 214,834
7 Claims. (Cl. 260—45.75)

The present invention relates to polyolefin compositions and more particularly to polyethylene and stereoregular polymers of propylene and higher α-olefins having improved stability to light.

Highly crystalline, high molecular weight polymers of ethylene, propylene, and higher α-olefins are well known and have many established uses. However, one of the deficiencies of such polymers which must be overcome to enable their use in many applications is poor stability to light.

It is disclosed in U.S. Patent 2,971,940 that bis(p-alkylphenol) sulfides in which part or all of the phenolic hydrogen atoms have been replaced by nickel (that is, compounds which comprise at most one atom of divalent nickel per molecule of bis(p-alkylphenol) sulfide) are effective light stabilizers for polypropylene. While these nickel stabilizers are used commercially and have proved to be quite valuable, they have two primary disadvantages. One disadvantage is that a polymer containing one of such stabilizers cannot be heated to a temperature higher than about 260 to 275° C. without turning dark in color. The other is that articles, e.g., fibers, made from the so-stabilized polymer have very poor resistance to gas discoloration. By gas discoloration is meant the change in color or yellowing that is caused by fumes from gas and oil flames or industrial atmospheres containing oxides of nitrogen. Since the average household contains such fumes, rugs, draperies, and other home furnishings made from fibers of the polymer are susceptible to gas discoloration in their customary use.

Nickel phenolates of bis(p-alkylphenol) sulfoxides and sulfones which contain, at the most, one atom of nickel per molecule of bis(p-alkylphenol) sulfoxide or sulfone have also been suggested as stabilizers for polypropylene. These, too, are effective stabilizers for stereoregular polypropylene as well as stereoregular polymers of higher alpha-olefins, and they possess marked improvement over the corresponding sulfides of U.S. 2,971,940 by virtue of being less susceptible to discoloration when heated and by virtue of providing improved resistance to gas discoloration.

The present invention is based on the discovery that nickel phenolates of bis(p-alkylphenol) sulfoxides and sulfones in which the ratio of nickel to bis(p-alkylphenol) sulfoxide or sulfone molecules is two (hereinafter sometimes referred to as the 2:1 phenolate) possess a significantly greater ability, pound for pound, to stabilize stereoregular polypropylene and stereoregular polymers or higher alpha-olefins against the deleterious effects of light than do such phenolates containing at most one atom of nickel or the compounds of U.S. 2,971,940. They also provide good resistance to gas discoloration and impart good dyeability to fibers in which they are present.

The invention is particularly useful in stabilizing stereoregular polymers of monoolefins having from 3 to 6 carbon atoms, including, for instance, polypropylene, poly(butene-1), poly(pentene-1), poly(3-methylbutene-1), and poly(4-methylpentene-1). Polyethylene, even though it degrades under the influence of light by a mechanism somewhat different than the above stereoregular polymers, is also susceptible to stabilization by the invention. Although the nickel phenolates used as additives in accordance with the present invention increase the light stability of polyethylene, stereoregular polypropylene, and related stereoregular polymers quite markedly, an even further increase in light stability can be achieved by also incorporating a phenolic compound in the polymer.

The stabilizers of the present invention are nickel phenolates in which each phenolic hydrogen atom has been replaced by a different divalent nickel ion and the remaining valence of each nickel ion is satisfied by an anion. These nickel phenolates thus contain 2 atoms of nickel per bis(p-alkylphenol) sulfoxide or sulfone molecule. Although on a laboratory scale it is possible to prepare the pure compounds, this is unnecessary to obtain products of high commercial utility. In accordance with the present invention, it has also been found that compositions comprising mixtures of the 2:1 nickel phenolates and the 1:1 nickel phenolates, i.e., phenolates which contain one atom of nickel per molecule of bis(p-alkylphenol) sulfoxide or sulfone, which mixtures contain at least 35% by weight of the 2:1 compound and contains an average of at least 1.3 nickel atoms per bis(p-alkylphenol) sulfoxide or sulfone molecule, also show demonstrable advantage over the 1:1 nickel phenolates on an equal weight basis.

The nickel phenolates of the present invention have the general formula:

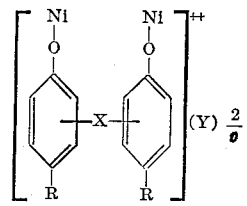

where R is an alkyl radical containing 1 to 20 carbon atoms, X is selected from the group consisting of sulfoxide and sulfonyl radicals, Y is an anion, and $v$ is the valence of the anion Y. At least 35% by weight of such nickel phenolate is present in nickel compositions containing an average of at least 1.3 nickel atoms per bis(p-alkylphenol) sulfoxide or sulfone molecule having the general formula:

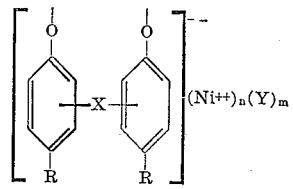

where R, X, and Y are as above, $n$ equals a number from 1.3 to 2, and $m$ equals $2n-2/v$ where $v$ is the valence of the anion Y. The nickel phenolates of the present invention, for simplicity, are illustrated above as having ionic bonds. This, however, does not exclude the possibility of covalent bonding in certain cases.

It is to be understood that in addition to the groups shown, more aromatic or aliphatic hydrocarbon groups or hydroxyl or other oxygenated groups may be included to modify the physical characteristics, e.g., compatibility or efficiency of the light stabilizer, without departing from the basic concept of this invention.

The nickel phenolates employed in the invention can be prepared by reacting 1 mole of the full sodium phenolate of the bis(p-alkylphenol) sulfoxide or sulfone with 2 moles of a nickel halide in anhydrous medium. Alternatively, the compounds may be produced by reacting 2 moles of a nickel salt of a weak acid with 1 mole of the bis(p-alkylphenol) sulfoxide or sulfone. Nickel compositions containing an average of at least 1.3 nickel atoms per bis(p-alkylphenol) sulfoxide or sulfone molecule can be prepared by either of these methods using at least 1.3 moles of the nickel halide or nickel salt. The full sodium phenolate can be made, for example, by reacting the phenol with at least two equivalents of sodium ethoxide in anhydrous ethanol. The bis(p-alkylphenol) sulfoxides and sulfones can be made by oxidation of the corresponding sulfides. Bis(p-amylphenol) sulfoxide can be made, for example, by oxidizing bis(p-amylphenol) sulfide with hydrogen peroxide in acetic acid using the technique shown by Wagner and Zook, Synthetic Organic Chemistry, New York, Wiley & Sons (1953), p. 801. Bis(p-amylphenol) sulfone can be made by oxidizing the above sulfide or sulfoxide with hydrogen peroxide in acetic acid using the same technique.

The nickel phenolates of the present invention are those of bis(p-alkylphenol) sulfoxides and sulfones in which the alkyl group contains 1 to 20 carbon atoms. Preferably, these phenolic sulfoxides and sulfones will be the o,o'-bis(p-alkylphenol) sulfoxides and sulfones. Exemplary of such compounds are o,o'-bis(p-cresol) sulfoxide, o,o'-bis(p-cresol) sulfone, o,o'-bis(p-ethylphenol) sulfoxide, o,o'-bis(p-ethylphenol) sulfone, o,o'-bis(p-isopropylphenol) sulfoxide, o,o'-bis(p-isopropylphenol) sulfone, o,o'-bis(p-tert-butylphenol) sulfoxide, o,o'-bis(p-tert-butylphenol) sulfone, o,o'-bis(p-methylphenol) sulfoxide, o,o'-bis(p-methylphenol) sulfone, o,o'-bis(p-amylphenol) sulfoxide, o,o'-bis(p-amylphenol) sulfone, o,o'-bis(p-octylphenol) sulfoxide, i.e., the o,o'-bis(p-1,1,3,3-tetramethylbutylphenol) sulfoxide, o,o'-bis(p-1,1,3,3-tetramethylbutylphenol) sulfone, o,o'-bis(p-nonylphenol) sulfoxide, o,o'-bis(p-nonylphenol) sulfone, o,o'-bis(p-cyclohexylphenol) sulfoxide, o,o'-bis(p-cyclohexylphenol) sulfone, o,o'-bis(p-dodecylphenol) sulfoxide, and o,o'-bis(p-dodecylphenol) sulfone, as well as o,m'-bis(p-amylphenol) sulfoxide, o,m'-bis(p-amylphenol) sulfone, o,m'-bis(p-octylphenol) sulfoxide, o,m'-bis(p-octylphenol) sulfone, and the like.

In the previous formulas, the permissible anion substituents are numerous and varied. Preferred anions include hydroxyl, alkoxy, acyloxy, oxide, halide, sulfate, nitrate, phosphate, thiocyanate, cyanide, p-toluenesulfonate, methanesulfonate, phosphite, aryl, and alkyl phosphonates, molybdate, and the like. Typical alkoxy radicals include methoxy, ethoxy, octyloxy, decyloxy, propoxy, butoxy, amyloxy, and dodecyloxy.

Typical nickel phenolates that can be used in accordance with the present invention include the nickel salts of o,o'-bis(p-alkylphenol) sulfoxides and sulfones wherein the p-alkyl group, salt-forming anion, and ratio of nickel atoms to bis(p-alkylphenol) sulfoxide and sulfone molecules (Ni/S) are as tabulated below.

Table I

| p-Alkyl Group | Salt-Forming Anion | Ni/S |
| --- | --- | --- |
| 1,1,3,3-tetramethylbutyl | 2-ethylhexanoate | 2 |
| Do | Hydroxide | 1.3 |
| Do | Acetate | 2 |
| Do | Ethoxide | |
| Do | do | 1.7 |
| Do | Laurate | 2 |
| Do | Valerate | 2 |
| Nonyl | 2-ethylhexanoate | 2 |
| Do | Acetate | 2 |
| t-Butyl | do | 2 |
| Do | 2-ethylhexanoate | 2 |
| t-Amyl | Acetate | 2 |
| Do | 2-ethylhexanoate | 2 |
| Cyclohexyl | Acetate | 2 |
| Do | 2-ethylhexanoate | 2 |
| t-Amyl | Thiocyanate | 1.6 |
| m-Methyl-p-t-amyl | Acetate | 1.8 |
| t-Amyl | Chloride | 1.4 |

Typical 2:1 nickel phenolates also include the o,m'-bis(p-alkylphenol) sulfoxides and sulfones wherein the p-alkyl group is isopropyl, butyl, amyl, cyclohexyl, octyl, and nonyl, and the salt-forming anion is propionate, isobutyrate, 2-ethyl hexanoate, and the like.

The amount of the nickel phenolate incorporated in the polymer can be varied from a very small amount up to several percent. More specifically, beneficial results are normally obtained when it is employed in an amount from about 0.01% to about 5% by weight of the polymer. The optimum amount will usually lie between about 0.1% to 2.5% by weight of the polymer, depending primarily upon the degree of stability desired and whether or not the phenolate is employed as a mixture with the 1:1 nickel phenolate.

As previously mentioned, one of the preferred but optional embodiments of the invention comprises incorporating into the polymer a phenolic compound in addition to the nickel phenolate. By this embodiment, the ability of the nickel phenolate to stabilize the polymer is synergistically enhanced to an even greater degree. The phenolic compound, when used, preferably comprises from 0.01% to 5% by weight of the polymer. Suitable phenolic compounds that are useful in this embodiment include polyalkylphenols, alkylidene-bis(alkylphenol)s, 2(2'-hydroxyphenyl)-2,4,4 - polyalkylchromans, 4(2'-hydroxyphenyl) - 2,2,4 - polyalkylchromans, thiobisphenols, and adducts of an alkylphenol and a cyclic terpene.

The phenolic compounds used to produce the compositions of the invention are well known. The polyalkylphenols that can be used are either di- or trialkylphenols. Particularly preferred are the 2,4,6-trialkylphenols described in U.S. 2,581,907 to Smith, Jr., et al. Inclusive of such compounds are:

2,4-dimethyl-6-t-butylphenol,
2,4-dimethyl-6(alpha,alpha,gamma,gamma-tetra-methylbutyl)phenol,
2,6-di-t-butyl-4-methylphenol,
2-methyl-4,6-di-t-butylphenol,
2,6-di-t-butyl-4-sec-butylphenol,
2,4,6-tri-t-butylphenol,
2,4,6-triethylphenol,
2,4,6-tri-n-propylphenol,
2,4,6-triisopropylphenol,
2,6-di-t-octyl-4-propylphenol,
2,6-di-t-butyl-4-ethylphenol,
2,4-dicyclohexyl-6-methylphenol,
2-isopropyl-4-methyl-6-t-butylphenol,
2,4-dimethyl-6-t-amylphenol,
2,4-di-t-amyl-6-methylphenol,
2,6-di-t-butyl-4-isopropylphenol,
2,6-di-t-amyl-4-methylphenol,
2,6-di-t-amyl-4-isopropylphenol,
2,4-diisopropyl-6-t-butylphenol, and
2,4-diisopropyl-6-sec-hexylphenol.

The preferred compounds of this class are those which have secondary or tertiary alkyl groups at the 2- and 6-position and a normal alkyl group at the 4-position, a representative of this class being 2,6-di-t-butyl-p-cresol. More preferably, the normal alkyl group in the 4-position is one containing from about 1 to 20 carbon atoms while the secondary or tertiary alkyl groups in the 2- and 6-positions each contain from about 3 to 20 carbon atoms. Any of the dialkylphenols are suitable; particularly preferred is the 2,6-di-t-butylphenol.

The second class of phenolic compound, the alkylidene-bis(alkylphenol), is characterized by the general formula

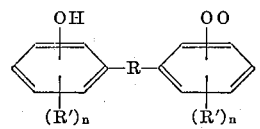

wherein R is an alkylidene radical of 1 to 5 carbon atoms and wherein R' is an alkyl group of 1 to 12 carbon atoms and n is an integer from 1 to 3. When more than one R' substituent is present on a phenyl group, each R' can be the same or different.

Exemplary of these alkylidene-bis(alkylphenol)s that may be used are 2,2'-methylene-bis(5-isopropylphenol),
2,2'-methylene-bis(4-methyl-6-isopropylphenol),
2,2'-methylene-bis(4-methyl-6-t-butylphenol),
2,2'-methylene-bis(4-t-butyl-6-methylphenol),
2,2'-methylene-bis(4,6-di-t-butylphenol),
2,2'-methylene-bis(4-nonylphenol),
2,2'-methylene-bis(4-decylphenol),
4,4'-methylene-bis(2,6-di-t-butylphenol),
2,2'-isopropylidene-bis(5-methylphenol),
4,4'-methylene-bis(2-methyl-6-t-butylphenol),
2,2'-ethylidene-bis(4-methyl-6-t-butylphenol),
2,2'-ethylidene-bis(4,6-di-t-butylphenol),
2,2'-ethylidene-bis(4-octylphenol),
2,2'-ethylidene-bis(4-nonylphenol),
2,2'-isopropylidene-bis(4-methyl-6-isopropylphenol),
2,2'-isopropylidene-bis(4-isopropylphenol),
2,2'-isopropylidene-bis(4-isopropyl-6-methylphenol),
2,2'-isopropylidene-bis(4-methyl-6-t-butylphenol),
2,2'-isopropylidene-bis(4-octylphenol),
2,2'-isopropylidene-bis(4-nonylphenol),
2,2'-isopropylidene-bis(4-decylphenol),
2,2'-isobutylidene-bis(4-methyl-6-t-butylphenol),
2,2'-isobutylidene-bis(4-noylphenol),
4,4'-butylidene-bis(3-methyl-6-t-butylphenol), etc.

The 2(or 4)-(2'-hydroxyphenyl) chromans that may be used are those which have one of the following general formulae:

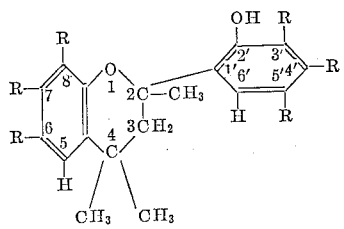

or

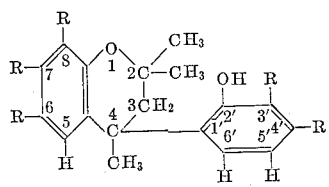

where each R may be hydrogen, or alkyl, but at least one R in each of the aromatic rings is alkyl. These compounds may also be named as benzopyrans. Thus, the 2-(2'-hydroxyphenyl)chromans may be named as 2,3-dihydro-2-(2'-hydroxyphenyl)-1,4-benzopyrans or 3,4-dihydro-2-(2'-hydroxyphenyl)-1,2,-benzopyrans and the 4-(2'-hydroxyphenyl)chromans may be named as 2,3-dihydro-4-(2'-hydroxyphenyl)-1,4-benzopyrans or 3,4-dihydro-4-(2'-hydroxyphenyl)-1,2 - benzopyrans. The 2-(2'-hydroxyphenyl)chromans are also sometimes named as flavans, i.e., 2'-hydroxyflavans. The alkyl substituents in each of the aromatic rings may be any alkyl radical, as, for example, methyl, ethyl, propyl, isopropyl, butyl, isobutyl, tert-butyl, amyl, hexyl, isohexyl, octyl, isooctyl, 2-ethylhexyl, nonyl, isononyl, decyl, undecyl, dodecyl, etc. Preferably, at least one alkyl radical in each aromatic ring will contain at least four carbon atoms or the sum of the carbon atoms in the alkyl radicals in each ring will be at least four. Exemplary of these 2(or 4)-(2'-hydroxyphenyl)chromans that may be used in combination with the nickel complexes are 2-(2'-hydroxyphenyl)-2,4,4,5',6-pentamethylchroman,
4-(2'-hydroxyphenyl)-2,2,4,5'-6-pentamethylchroman,
2-(2'-hydroxyphenyl)-5',6-diisopropyl-2,4,4-trimethylchroman,
2-(2'-hydroxyphenyl)-5',6-diisopropyl-2,4,4,3',8-pentamethylchroman,
2-(2'-hydroxyphenyl)-5',6-di-t-butyl-2,4,4-trimethylchroman,
4-(2'-hydroxyphenyl)-5',6-di-t-butyl-2,2,4-trimethylchroman,
2-(2'-hydrophenyl-5',6-dioctyl-2,4,4-trimethylchroman,
2-(2'-hydroxyphenyl)-5',6-dinonyl-2,4,4-trimethylchroman,
4-(2'-hydroxyphenyl)-5',6-dinonyl-2,2,4-trimethylchroman,
2-(2'-hydroxyphenyl)-5',6-didecyl-2,4,4-trimethylchroman, etc.

The alkylidene-bis(alkylphenol)s are prepared by any of the well-known procedures of the prior art. Usually they are prepared by reacting an alkylphenol with formaldehyde, acetaldehyde, acetone, or methyl ethyl ketone, etc., in the presence of a strong acid such as hydrochloric acid, etc. In a similar fashion, the 2-(2-hydroxyphenyl)chromans are prepared by reacting an alkylphenol with acetone and the 4-(2'-hydroxyphenyl)chromans are prepared by reacting an alkylphenol with mesityl oxide. Thus, in many of these reactions a mixture of alkylidenebis(alkylphenol)s and (2'-hydroxyphenyl)chromans is obtained, as, for example, when acetone is condensed or reacted with an alkylphenol the reaction product may be a 2-(2'-hydroxyphenyl)chroman or an isopropylidenebis(alkylphenol), depending on the reaction conditions, or the reaction product may be a mixture of these two types of compounds. In such cases the individual compounds need not be isolated but instead the reaction product may be used with excellent results.

Suitable thiobisphenols include 2,2'-thiobis(4-methyl-6-t-butylphenol) and 4,4'-thiobis(3-methyl-6-t-butylphenol). The terpene-phenol adducts that are used in accordance with the invention are known materials that have been described frequently in the prior art.

Generically defined, they are adducts of phenol or an alkylphenol that contains from 1 to 2 alkyl substituents of 1 to 10 carbon atoms each and a cyclic unsaturated terpene or dihydroterpene of empirical formula $C_{10}H_{16}$ or $C_{10}H_{18}$, respectively. They can be prepared by condensing phenol, or an alkylphenol, with the terpene, or dihydroterpene, in varying ratios in the presence of an acidic catalyst.

Suitable cyclic terpenes and dihydroterpenes from which the aforesaid adducts can be made include carvomenthene, dipentene, α-pinene, α-terpinene, terpinolene, 2-menthene, 3-menthene, dihydroterpinolene, dihydrodipentene, camphene, $\Delta^3$-carene, β-pinene, and the like. Suitable phenols, in addition to phenol itself, include the various isomeric cresols, 2,4-xylenol and other isomeric xylenols, p-sec-butylphenol, p-isopropylphenol, o-isopropylphenol, m-isopropylphenol, o,o'-diisopropylpenol, o,o'-di-t-butylphenol, o-amylphenol, o-nonylphenol, and similar compounds.

The two reactants can be condensed in varying ratios. Any ratio within the range of 0.3 to 3 moles of terpene or dihydroterpene per mole of the phenolic compound is satisfactory, but it is preferred to employ a ratio within the narrower range of 0.5 to 2.5 moles of terpene or dihydroterpene per mole of the phenolic compound.

The adduct formation is carried out by contacting the two reactants in the presence of an acid catalyst at a temperature within the range of about 0 to 150° C. and allowing the reaction to proceed. An inert solvent may be used as a reaction medium for convenience if so desired. Normally the reaction will go to substantial completion in from 1½ to 5½ hours. Upon termination of the reaction, unconsumed reactants and volatile by-products can be removed by distillation at reduced pressure since the adducts themselves are high boiling materials.

The acid catalyst can be any of those acids or acidic compounds that are useful catalysts in condensation reactions generally. These include mineral acids such as sulfuric acid, organic acids such as p-toluene sulfonic acid, boron trifluoride and its derivatives, as, for instance, complexes of boron trifluoride, and an ether, e.g., boron trifluoride-ethyl ether complex, metal chlorides such as aluminum chloride and stannic chloride, and acidic clays.

The terpene-phenol adducts are in all cases not a simple chemical compound but rather a mixture of compounds, principally phenolic ethers and terpenylated phenol. Thus, for instance, the adduct of 2 moles of camphene and 1 mole of p-cresol is a mixture of compounds in which mixture the principal ingredient is diisobornyl-p-cresol (the isobornyl radical being formed by isomerization of camphene) but which also contains lesser amounts of the isobornyl ether of p-cresol.

In the case of other terpenes, or dihydroterpenes, and other phenols, similar adducts are formed in which the proportion of ingredients will vary depending on the ratio of reactants and the catalyst employed. Consequently, the adducts employed in the invention are incapable of structural definition.

The stabilizers used in accordance with this invention may be admixed with the polyolefin by any of the usual procedures for incorporating a stabilizer in a solid material. A simple method is to dissolve the stabilizers in a low boiling solvent such as benzene or hexane and, after thoroughly mixing the solution with the polymer in flake or other such form, evaporating the solvent; or they may be incorporated by various means of mechanical mixing, etc.

In addition to the nickel phenolate and the phenolic compound, there may also be present compounds capable of decomposing peroxides, e.g., dilauryl thiodipropionate, dialkyldisulfides, zinc dialkyldithiocarbamates, zinc dialkyldithiophosphates, and the like, which help to improve the heat stability of the polymer. The stabilizers may also be used in combination with other stabilizers such as ultraviolet light absorbers, antacids such as calcium soaps, organic phosphites, or other antioxidants. Other materials may also be incorporated in the polymer, as, for example, pigments, dyes, fillers, antistatic agents, etc.

The following examples illustrate the preparation of some nickel derivatives of the bis(p-alkylphenol) sulfoxides and sulfones of this invention and the degree of stabilization that is obtained when the derivatives are incorporated in polyolefins. The term "RSV" as used herein denotes reduced specific viscosity, which is the specific viscosity divided by concentration of a 0.1% weight/volume solution of polymer in decahydronaphthalene at 135° C. All parts and percentages are by weight and the percentages are based on the weight of polymer unless otherwise stated. The Ni/S ratio as used in the examples denotes the average ratio of nickel atoms to bis(p-alkylphenol) sulfoxide or sulfone molecules, as the case may be.

EXAMPLE 1

0.23 part of sodium was dissolved in 20 parts anhydrous ethyl alcohol in a centrifuge bottle. 1.19 parts of 0,0'-bis(p-1,1,3,3-tetramethylbutylphenol) sulfone were added to the ethyl alcohol solution and dissolved with gentle warming. A solution of 0.65 part anhydrous nickel chloride in 15 parts anhydrous ethanol (prepared in advance and allowed to stand for three weeks in a capped bottle prior to use) was added. The bottle was then capped to prevent undue exposure to moist air, and the contents centrifuged to separate the sodium chloride. After centrifuging, the centrifugate was freed of solvents by distillation in vacuo at 20° C. The residue (1.73 parts) of green solid contained 17.5% nickel (by direct ashing), 52.9% carbon, and 7.2% hydrogen. This analysis indicated that approximately two nickel atoms were present in the molecule, the anions on the nickel being ethoxy.

EXAMPLE 2

A mixture of 3.45 parts of nickel 2-ethylhexanoate and 2.37 parts o,o'-bis(p-1,1,3,3-tetramethylbutylphenol) sulfone was heated for two hours at 140° C. and 1 mm. pressure, then at 160° C. for thirty minutes, and finally for thirty minutes at 180° C., the reaction being carried out so that the by-product 2-ethylhexanoic acid was distilled off as formed. The residue (4.31 parts of green resin) contained 14.1% nickel (determined as nickel glyoxime), 57.0% carbon, and 8.0% hydrogen. The analysis indicated the presence of two nickel atoms per molecule, the anions on the nickel atoms being 2-ethylhexanoate.

EXAMPLE 3

Example 2 was repeated except that 2.30 parts of o,o'-bis(p-1,1,3,3-tetramethylbutylphenol) sulfoxide was used in place of the sulfone. The product (4.29 parts of green resin) contained 13.0% nickel.

EXAMPLE 4

The procedure of Example 1 was repeated using 2.37 parts of o,o'-bis(p-1,1,3,3-tetramethylbutylphenol) sulfone dissolved in a solution of 0.23 part sodium in 40 ml. anhydrous ethanol, and a solution of 1.30 parts anhydrous nickel chloride in 30 parts anhydrous ethanol. When precipitation of the sodium chloride was complete, a solution of 0.82 part sodium acetate in 50 parts anhydrous ethanol was added. After centrifugation to separate the sodium chloride, the solvent was removed from the centrifugate by distillation in vacuo at 20° C. The residue (3.61 parts of green crystalline solid) contained 15.8% nickel. In this product the anion on each nickel atom was acetate.

EXAMPLE 5

A 40% solution of o,o'-bis(p-1,1,3,3-tetramethylbutylphenol) sulfone in xylene was heated with a quantity of nickel acetate tetrahydrate equivalent to the number of phenolic OH groups in the bisphenol molecule, at boiling, the water and acetic acid being distilled off as formed, some xylene distilling in the process. The reaction mixture was then filtered to remove insoluble compounds and the filtrate evaporated to remove all the xylene. The residue, a green crystalline solid, contained 10.1% nickel. This product contained approximately one nickel atom per molecule, possibly with a molecule of acetic acid coordinated to the nickel atom.

This product, the full nickel phenolate of o,o'-bis(p-1,1,3,3-tetramethylbutylphenol) sulfone containing a Ni/S ratio of 1:1 (or alternatively the one prepared by reacting equal moles of the sodium phenolate of the corresponding sulfone with nickel chloride under anhydrous conditions according to the procedure of Example 1) was dissolved in boiling hexane. Ninety-five percent ethanol was then added and most of the hexane removed by distillation. The green crystals which formed upon cooling the residue contained 13.7% nickel. A nickel salt containing 1.3 nickel atoms per sulfone molecule with hydroxyl groups satisfying the free nickel valences would contain 13.6% nickel.

EXAMPLES 6–9

In these examples different portions of stereoregular polypropylene having a birefringent melting point of about 167° C. and a reduced specific viscosity of 4.0 were thoroughly blended with 0.5% of the reaction product of 2 moles of nonylphenol and 1 mole of acetone, the reaction product comprising a mixture of isopropylidene-bis(nonylphenol) and 2-(2'-hydroxyphenyl)-2,4,4-trimethyl-5',6-dinonylchroman, hereinafter referred to as NP-A-RP, and specified amounts of a nickel phenolate of an o,o'-bis(p-1,1,3,3-tetramethylbutylphenol) sulfone containing varying amounts of nickel per bisphenol sulfone molecule. Each blend was extruded into molding powder at 210° C., and the molding product was then pressed into sheets 25 mils thick. Strips cut from these sheets and 0.5 inch wide were exposed to outdoor weathering in southern Florida at a 45° angle facing south. During the exposure the development of brittleness in each strip was observed by periodically folding to an angle of 180° and noting any change taking place on the fold line. The following rating schedule was used to evaluate the degree of brittleness from outdoor exposure:

1=Unchanged from original condition
2=Slight surface crazing on fold
3=Shallow cracks on fold
4=Breaks in cheesy manner, but pieces hang together, considered failure
5=Brittle break failure Compositions and exposure data are as follows:

Table II

| Example | Stabilizer | Ni/S Ratio | Percent Nickel Stabilizer by Weight of Polymer | Embrittlement Time Florida Exposure Rating | |
|---|---|---|---|---|---|
| | | | | 20,000 Langleys | 30,000 Langleys |
| 6 | Nickel phenol phenolate of o,o'-bis(p-1,1,3,3-tetramethylbutylphenol) sulfone. | 1:2 | 0.50 | 5 | 5 |
| 7 | Full nickel phenolate of o,o'-bis(p-1,1,3,3-tetramethylbutylphenol) sulfone. | 1:1 | 0.27 | 3 | 5 |
| 8 | Nickel phenolate of o,o'-bis(p-1,1,3,3-tetramethylbutylphenol) sulfone wherein anion Y is acetate. | 2:1 | 0.15 | 2 | 3-4 |
| 9 | Nickel phenolate of o,o'-bis(p-1,1,3,3-tetramethylbutylphenol) sulfone wherein anion Y is hydroxide. | 1.3:1 | 0.70 | 2 | 2 |
| Control | (No nickel phenolate but NP-A-RP) | | | 5 | |
| Do | (No nickel phenolate and no NP-A-RP) | | | 5 | |

EXAMPLE 10

The procedure of Examples 6–9 was repeated using 0.5% of the product of Example 1 (Ni/S ratio of 2) and 0.5% NP-A-RP. Exposure in Florida gave ratings of 2, 3, and 3 at 20,000, 30,000, and 40,000 langleys, respectively.

EXAMPLE 11

Example 10 was repeated using instead of the product of Example 1, 0.5% of the product of Example 3 (Ni/S ratio of about 2:1). Exposure in Florida gave a rating of 3 at 40,000 langleys.

EXAMPLES 12–13

The procedure of Examples 6–9 was repeated using 0.5% of the nickel phenolates of o,o'-bis(p-1,1,3,3-tetramethylbutylphenol) sulfone containing various anions and varying amounts of nickel per bisphenol sulfone molecule and 0.5% NP-A-RP, the phenolate of Example 13 being the product of Example 5. Compositions and exposure data are as follows:

Table III

| Example | Anion of Ni Stabilizer | | Ni/S Ratio | Embrittlement Time Florida Exposure Rating | | |
|---|---|---|---|---|---|---|
| | Anion | Percent Ni | | 20,000 Langleys | 30,000 Langleys | 40,000 Langleys |
| 12 | OC$_2$H$_5$ | 15.4 | 1.7 | 2 | 3 | 3 |
| 13 | OH | 13.7 | 1.3 | 2 | 3 | 3 |

EXAMPLE 14

Polyethylene having a density of 0.96 was blended with 0.5% of the nickel phenolate of Example 8, the blend extruded into molding powder, pressed into sheets, and cut into strips according to the procedure of Examples 6–9. In this case the exposure rating was determined by fastening the strips onto pieces of white cardboard and placing in a fadeometer. At 24-hour intervals, the strips were tested for development of brittleness by bending. The time noted for each strip to become brittle to the extent that it breaks when bent double was noted as the embrittlement time. At the end of fifty-five days in the fadeometer no breakage had occurred whereas the control containing no nickel stabilizer failed in seven days.

From the foregoing it is apparent that polyethylene and stereoregular polymers of alpha-olefins having 3 or more carbons may be modified in accordance with this invention to impart improved light stability to the polymers as well as to any shaped object made from these polymers.

Articles, e.g., fibers made from polyolefins containing the nickel phenolates of the present invention, also exhibit improved dyeability. In general, useful dyes fall into five main classes, or types; namely, disperse dyes, azoic dyes, vat dyes, vat ester dyes, and sulfur dyes. These are all well-known dye types, and a substantial listing of individual dyes of each type appears in the Technical Manual of the American Association of Textile Chemists and Colorists (AATCC), volume XXXVI (1960). Colour Index, second edition, 1956, edited jointly by the Society of Dyers and Colourists and the American Association of Textile Chemists and Colorists compiles a vast amount of information on many of the useful dyestuffs or prototypes of these at the time of publication relative to commercial names, manufacturers, chemical composition and how made, identification by C.I. numbers and names, and the like. Dyes of the disperse type and of the azoic type are preferred since they fully penetrate the fibers. Vat dyes, vat ester dyes, and sulfur dyes are less preferred since these dyes penetrate the fibers only superficially to produce "ring dyeings." In order to demonstrate the improved dyeability achieved with the compositions of the present invention, fabric knit from 210 denier 35 filament stereoregular polypropylene continuous yarn melt spun from the composition of Example 10 was dyed with the following dyestuffs, namely: Celliton Fast Yellow 4RL (General Dyestuffs); Polydye Blue GSFR (Interchemical); Sandoz WRN 4245 (experimental dyestuff, Sandoz); NAC BC 31674 (experimental dyestuff, National Aniline); Sandoz WRN 4214 (experimental dyestuff, Sandoz); Resolin Blue RRL (Bayer-Verona); C.I. 67415, Mordant Blue 27; C.I. Azoic Coupling Component 12 (C.I. 37550, Napthol AS-ITR) with C.I. Azoic Diazo Component 42 (C.I. 37150, Red Base ITR); and C.I. Azoic Coupling Component 12 with C.I. Azoic Diazo Component 20 (C.I. 31175, Blue Base BB), using known methods for dyeing hydrophobic artificial fibers. The dyed fabrics exhibited good dyeability, excellent washfastness, good resistance to dry-cleaning solvents, and good lightfastness when tested in accordance with the methods 85–1960, 61–1957–IIIA, and 16A–1960 described in the Technical Manual of the American Association of Textile Chemists and Colorists, volume XXXVI, 1960, Howes Publishing Co., Inc., N.Y. By contrast, fibers spun from polymers containing no nickel phenolate exhibited poor dyeability, fair-good washfastness, very poor resistance to dry-cleaning solvents, and poor lightfastness.

What I claim and desire to protect by Letters Patent is:

1. A polyolefin selected from the group consisting of polyethylene and a stereoregular polymer of an alpha-olefin having from 3 to 6 carbon atoms containing from about 0.01% to about 5% by weight of the polyolefin of a nickel phenolate of the formula:

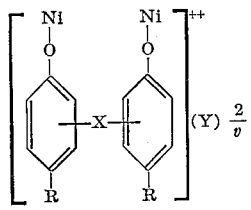

wherein R is an alkyl radical containing 1 to 20 carbon atoms, X is selected from the group consisting of sulfoxide and sulfonyl radicals, Y is an anion, and $v$ is the valence of the anion Y.

2. The composition of claim 1 also containing from 0.01% to 5% by weight of the polyolefin of phenolic compound selected from the group consisting of polyalkylphenols, alkylidene-bis(alkylphenol)s, 2-(2'-hydroxyphenyl)-2,4,4-polyalkylchromans, 4-(2'-hydroxyphenyl)-2,2,4-polyalkylchromans, thiobisphenols and adducts of an alkylphenol and a cyclic terpene.

3. The composition of claim 1 in which the polyolefin is polypropylene.

4. The composition of claim 1 in which the nickel phenolate is present as a mixture with another nickel phenolate selected from the group consisting of the nickel phenolates of bis(p-alkylphenol) sulfoxides and bis(p-alkylphenol) sulfones, which contain one atom of nickel per molecule of said bis(p-alkylphenol), said first nickel phenolate comprising at least 35% by weight of the mixture of the phenolates.

5. The composition of claim 1 in which Y is an anion selected from the group consisting of hydroxyl, alkoxy, acyloxy, oxide, halide, nitrate, phosphate, sulfate, cyanide, and thiocyanate.

6. The composition of claim 5 in which the nickel phenolate is present as a mixture with another nickel phenolate selected from the group consisting of the nickel phenolates of bis(p-alkylphenol) sulfoxides and bis(p-alkylphenol) sulfones which contain one atom of nickel per molecule of said bis(p-alkylphenol), said first nickel phenolate comprising at least 35% by weight of the mixture of the phenolates.

7. A stereoregular polymer of propylene containing from about 0.1% to 2.5% by weight of the polymer of the nickel phenolate of o,o'-bis(p-1,1,3,3-tetramethylbutylphenol) sulfone containing two atoms of nickel per bisphenol molecule and having the free nickel valences satisfied by acetate groups.

References Cited by the Examiner

UNITED STATES PATENTS

| | | | |
|---|---|---|---|
| 2,665,265 | 1/1954 | Burgess | 260—45.75 |
| 2,971,940 | 2/1961 | Fuchsman et al. | 260—45.75 |
| 2,971,941 | 2/1961 | Fuchsman et al. | 260—45.75 |
| 2,971,968 | 2/1961 | Nicholson | 260—439 |
| 3,006,885 | 10/1961 | Dickson | 260—45.75 |
| 3,006,886 | 10/1961 | Schilling | 260—45.75 |
| 3,032,573 | 5/1962 | Meriwether et al. | 260—439 |
| 3,072,601 | 1/1963 | Breslow | 260—45.75 |
| 3,074,909 | 1/1963 | Mattach | 260—45.75 |
| 3,074,910 | 1/1963 | Dickson | 260—45.75 |
| 3,098,863 | 7/1963 | Dessauer et al. | 260—439 |
| 3,102,107 | 8/1963 | Soeder | 260—45.75 |
| 3,107,232 | 10/1963 | Matlack | 260—45.75 |
| 3,127,372 | 3/1964 | Matlack | 260—45.74 |

LEON J. BERCOVITZ, *Primary Examiner.*

G. W. RAUCHFUSS, *Assistant Examiner.*